United States Patent [19]
Oshio et al.

[11] Patent Number: 5,623,474
[45] Date of Patent: Apr. 22, 1997

[54] DISK APPARATUS HAVING AUTOMATIC ADJUSTMENT OF ADAPTIVE FILTER EQUALIZATION PARAMETER USING TRAINING PATTERN

[75] Inventors: Umeo Oshio; Yoshiyuki Nagasaka, both of Kawasaki, Japan

[73] Assignee: Fujitsu Limited, Kawasaki, Japan

[21] Appl. No.: 513,222

[22] Filed: Aug. 10, 1995

[30] Foreign Application Priority Data

Jan. 20, 1995 [JP] Japan .................................. 7-006981

[51] Int. Cl.⁶ .............................. G11B 7/00; G11B 5/02
[52] U.S. Cl. .............................. 369/124; 369/47; 360/27; 360/65
[58] Field of Search ................................. 369/59, 47, 48, 369/124, 54, 58; 360/25, 27, 65

[56] References Cited

U.S. PATENT DOCUMENTS 5,060,088 10/1991 Dolvio et al. .............................. 360/46

FOREIGN PATENT DOCUMENTS

| | | |
|---|---|---|
| 58-097928 | 6/1983 | Japan . |
| 58-130655 | 8/1983 | Japan . |
| 60-079566 | 5/1985 | Japan . |
| 62-256569 | 11/1987 | Japan . |
| 63-308453 | 12/1988 | Japan . |
| 2-150114 | 6/1990 | Japan . |
| 5-175788 | 7/1993 | Japan . |
| 5-342513 | 12/1993 | Japan . |

*Primary Examiner*—P. W. Huber
*Attorney, Agent, or Firm*—Greer, Burns & Crain, Ltd.

[57] ABSTRACT

A training pattern which is used for a waveform equalization is preliminarily recorded on a disk medium and the waveform equalization to suppress an interference between bits of a read waveform by an adaptive type equalizer is performed. An error detector executes a training operation for adjusting an equalization amount of the adaptive type equalizer so as to minimize an error due to the interference between bits of the read waveform on the basis of the training pattern read out from the disk medium. A bit pattern detector detects a predetermined bit pattern "00" included in the training pattern and instructs the start of the training operation to the error detector by the detection of the first bit pattern "00". A counter counts the number of detection times of the bit pattern "00" by the bit pattern detector and instructs the end of the training operation to the error detector when the number of detection times reaches a predetermined value.

9 Claims, 12 Drawing Sheets

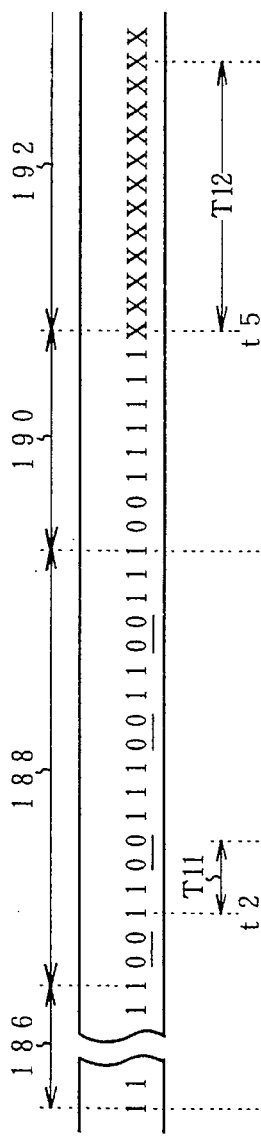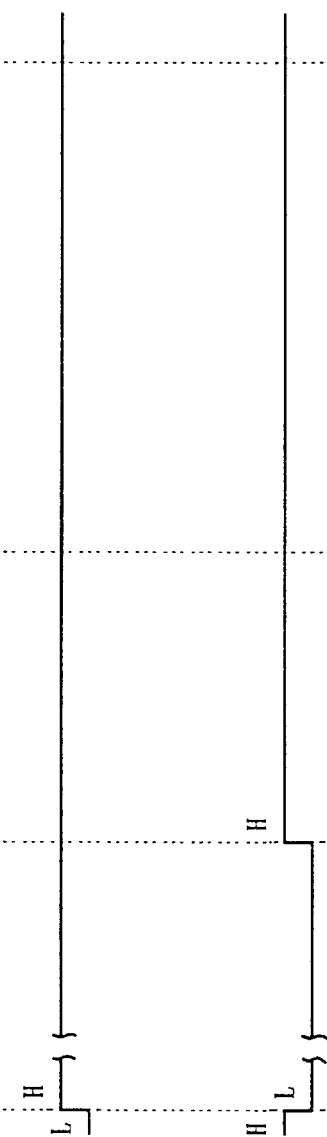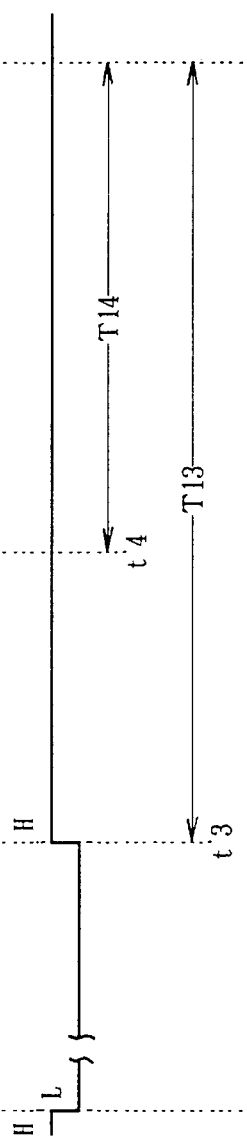
FIG. 2A PRIOR ART
FIG. 2B PRIOR ART
FIG. 2C PRIOR ART
FIG. 2D PRIOR ART

F I G. 5 A  100110011

F I G. 5 B  100110011 100110011

F I G. 5 C

| DETECTION PATTERN | THE NUMBER OF DETECTING TIMES |
|---|---|
| 0 0 | 4 |
| 1 1 | 4 |
| 0 0 1 1 | 4 |

F I G. 5 D

| DETECTION PATTERN | THE NUMBER OF DETECTING TIMES |
|---|---|
| 0 0 | 3 |
| 1 1 | 3 |
| 0 0 1 1 | 3 |

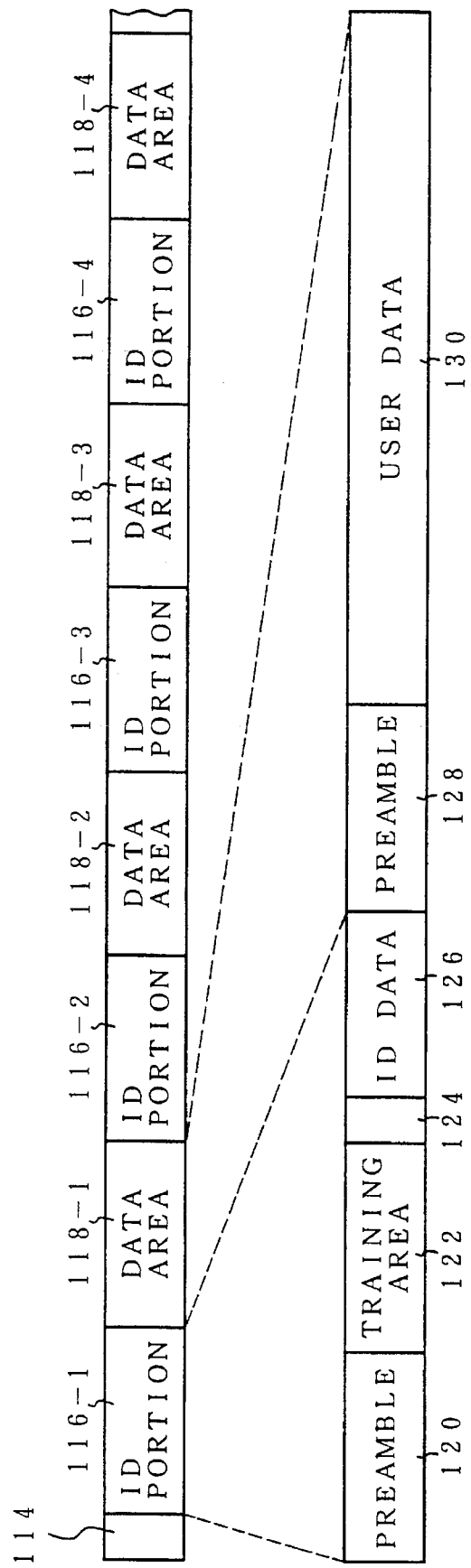

DISK APPARATUS HAVING AUTOMATIC ADJUSTMENT OF ADAPTIVE FILTER EQUALIZATION PARAMETER USING TRAINING PATTERN

BACKGROUND OF THE INVENTION

The present invention relates to a disk apparatus using a partial response maximum likelihood method for performing a waveform equalization so as to suppress an interference between bits of a read waveform by using a transversal filter known as an adaptive type equalizer and, more particularly, to a disk apparatus which can automatically adjust a waveform equalization amount of an adaptive type equalizer by using a training pattern which has been preformatted onto a disk medium.

Hitherto, in case of using a partial response maximum likelihood detecting method as a level detecting method, for example, a PR4ML (Partial Response Class 4 Maximum Likelihood) detecting method for a demodulating circuit of a magnetic disk apparatus, an optical disk apparatus, or the like, it is very important to accurately execute a waveform equalization including a transmission path. When the waveform equalization is not accurately executed, sampling points of a read waveform are deviated, so that an equalization error by the equalization occurs and an error rate is deteriorated by an amount corresponding to such an error. In the disk apparatus, electromagnetic converting characteristics of the transmission path including a disk medium and heads momentarily change due to a temperature change, an aging change, or the like. In order to compensate for such changes, an adaptive type waveform equalizer known as a transversal filter is used. At the head of a data frame of a disk medium, a training area in which a waveform pattern for determining a waveform equalization amount of the transversal filter by a training has been recorded is provided. A predetermined bit pattern for the detection of interference between bits is recorded in the training area. The transversal filter reads out a waveform of the bit pattern in the training area prior to the reading of a data frame, feed-back controls so as to minimize the equalization error, and adjusts tap coefficients. By such a training, the waveform equalization amount can be adjusted to the optimum equalization amount, adaptive to the electromagnetic converting characteristics of the transmission path, including the disk medium and the head at that time. After that, the equalization amount is fixed to the optimum state until the next training area is. The equalization amount is adjusted each time, as mentioned above, just before the data is read, thereby accurately executing the waveform equalization.

FIG. 1 shows a data demodulating circuit of a conventional magnetic disk apparatus using the partial response maximum likelihood detecting method. A read signal of a head 115 is amplified by an AGC amplifier 170. After that, the signal is filtered by a (1+D) filter 172 in an analog manner, and is sampled as digital waveform data by an A/D converter 174. The sampled data is subjected to a waveform equalization to suppress an interference between bits by an adaptive equalizer 176 having a transversal filter. Correct bit 0 or 1 is detected according to a maximum likelihood algorithm by a Viterbi demodulator 178. An error detector 180 executes a training operation for adjusting tap coefficients of a transversal filter so as to minimize an equalization error of the adaptive equalizer 176 on the basis of a read signal of a training pattern of the head 115. When a start instruction signal E12 which is generated when the start of the training pattern is detected by a "00" pattern detector 182 is received, the error detector 180 starts the training operation. A stop instruction signal E13 is generated when a pattern of a sync byte subsequent to the training pattern is detected by a sync byte detector 184. When a stop instruction E13 is received, the error detector 180 stops the training operation. The "00" pattern detector 182 and sync byte detector 184 enter an enable state by a read gate signal E11. As a training pattern, a method of repeating a "100110011" pattern a plurality of times is generally used, since an interference amount between bits can be easily detected.

FIG. 2A shows a recording pattern in the training area together with recording patterns before and after such a recording pattern. A training area 188 is provided after a preamble 186. In the training area 188, the "100110011" pattern is repeated twice. Subsequent to the training area 188, a pattern "100111111" of a sync byte 190 is provided and an ID portion 192 follows. The sync byte 190 is written as a flag to read ID information in the subsequent ID portion 192. In case of a reading operation, the read gate signal E11 of FIG. 2B is set to the H level at time t1 when a data frame starts and enters the enable state. The "00" pattern detector 182 outputs the detection signal E12, which is set to the H level at time t3, after the elapse of a pattern detection period T1 since the input of a "00" pattern at time t2 as shown in FIG. 2C, thereby starting the training operation by the error detector 180. Although a read signal of the pattern in the training area 188 in FIG. 2A is finished at time t4, the sync byte detector 184 which received a read signal of the next sync byte 190 detects a sync byte at time t6 after the elapse of a sync byte detection time T12 from time t5 when the sync byte 190 is finished and the detection signal E13 of FIG. 2D is set to the H level, thereby finishing the training operation by the error detector 180. That is, the training operation of the adaptive equalizer 176 starts at the first "00" pattern included in the training pattern and ends by detecting the next sync byte.

In such a training operation in the conventional magnetic disk apparatus, although the detection of the first "00" pattern in the training pattern is completed in a time of a few bits, a time of more than about 10 bits is necessary because the sync byte only detected after all of the sync byte patterns were read. On the other hand, the training operation of the adaptive equalizer 176 needs to be executed within the training pattern as much as possible. When the training operation is executed out of the training pattern, the error detector 180 erroneously operates so as to enhance the equalization error. Hitherto, although there is no problem in the start of the training from time t3 based on the "00" pattern detection signal E12 of FIG. 2C as mentioned above, since end time t6 by the sync byte detection signal E13 of FIG. 2D is deviated out of the training area 188, an erroneous training period T14 from time t4 to time t6 occurs. Therefore, by the unnecessary training operation of the error detector 180 in the erroneous training period T14, the adaptive equalizer 176 is adjusted to a state in which the equalization error is large, so that there is a fear such that the error rate cannot be guaranteed.

In a magnetic disk apparatus using an embedded servo system (data surface servo system) for detecting a head position by recording servo information on a data surface, the training pattern which is used for the equalization amount adjustment of the adaptive equalizer is ordinarily provided at the head of a data frame (sector). By providing the training area for every data frame, however, an area to store data is decreased by an amount corresponding to such training areas, so that a formatting efficiency deteriorates and an increase in memory capacity is disturbed.

SUMMARY OF THE INVENTION

According to the invention, there is provided a magnetic disk apparatus which can prevent generation of an equalization caused by an unnecessary training operation, by detecting the end of a training pattern as soon as possible. The magnetic disk apparatus of the invention comprises: a disk medium on which the training pattern used for a waveform equalization has been preliminarily recorded; an adaptive type equalizer for equalizing waveforms so as to suppress an interference between bits of a signal waveform of a read signal of the disk medium by a read head; and an error detector for executing the training operation for adjusting an equalization amount of the adaptive type equalizer so as to minimize the errors due to the interference between bits of the read waveform on the basis of the training pattern read out from the disk medium. Such a magnetic disk apparatus as mentioned above according to the present invention is characterized by comprising: a bit pattern detector for repeatedly detecting a predetermined bit pattern included in the read signal of the training pattern and instructing the error detector to start the training operation upon the first detection of the bit pattern; and a counter for counting the number of detection times of the bit pattern by the bit pattern detector, and instructing the error detector to end of the training operation when the number of detection times reaches a predetermined value. A pattern of "100110011" or a pattern in which "100110011" is repeated a plurality of number of times is recorded as a training pattern to the disk medium. The bit pattern detector detects a bit pattern "00", "11", or "0011" and instructs the error detector to start the training operation. When a count value of (N) times about the detection of the bit pattern "00", "11", or "0011" included in the training pattern is counted, the counter instructs the end of the training operation to the error detector. When the counter counts a predetermined number of times, for instance, (N-1), which is smaller than the count value of (N) times of the bit pattern "00", "11", or "0011" included in the training pattern, the counter can also instruct the start of the training operation to the error detector, thereby preventing an extension of the erroneous training period due to a detection failure.

According to the magnetic disk apparatus of the present invention, although a point that when the training operation is started is the same as that of the conventional apparatus, the number of detection times of the "00" pattern included in the training pattern is counted, and when the count value reaches a predetermined number of detection times, the training operation is finished. Thus, a period of time during which the erroneous training operation is executed by a pattern other than the training pattern for an interval from the completion of the reading of the training area until the end of the training operation can be remarkably reduced. Therefore, there is no erroneous detection of the equalization error by the error detector in case of the training operation, and the optimum waveform equalization amount adaptive to the characteristics of the transmission path including the disk medium and the head at that time is set to the adaptive type equalizer, thereby enabling the error rate to be guaranteed. The number of detection times of the "00" pattern for finishing the training operation is set to a number smaller than the number of "00" patterns included in the training pattern in consideration of the detection failure, thereby obtaining a redundancy. Even when the detection failure of the "00" pattern occurs, the training operation can be surely finished in the training area.

According to the invention, there is also provided a magnetic disk apparatus in which the training area is set so as to minimize a decrease in memory capacity of the disk medium. That is, in order to minimize the decrease in memory capacity even in case of recording the training pattern by the embedded servo system (data surface servo system) as well, the invention is characterized by providing the training area in which the training pattern has been recorded every servo frame of the disk medium. In this case, the training area can be provided at any one of the end, head, and inside of the servo frame. That is, with respect to the disk medium of the embedded servo system, an attention is paid to a point that the number of servo frames is smaller than the number of data frames, the training area is provided for every servo frame, so that an area which is occupied by the training areas can be reduced as compared with that in the conventional case where the training area is provided for every data frame, and a deterioration of the format efficiency when the training area is provided can be suppressed.

The above and other objects, features, and advantages of the present invention will become more apparent from the following detailed description with reference to the drawings.

BRIEF DESCRIPTION OF THE DRAWINGS

FIGS. 2A to 2D are timing charts for a training operation in FIG. 1;

FIGS. 5A to 5D are explanatory diagrams of training patterns, detection patterns, and the number of detection times which are used in FIG. 3;

FIG. 12 is an explanatory diagram of a track format of an embodiment of FIG. 11.

DETAILED DESCRIPTION OF THE PREFERRED EMBODIMENTS

Figure 1:
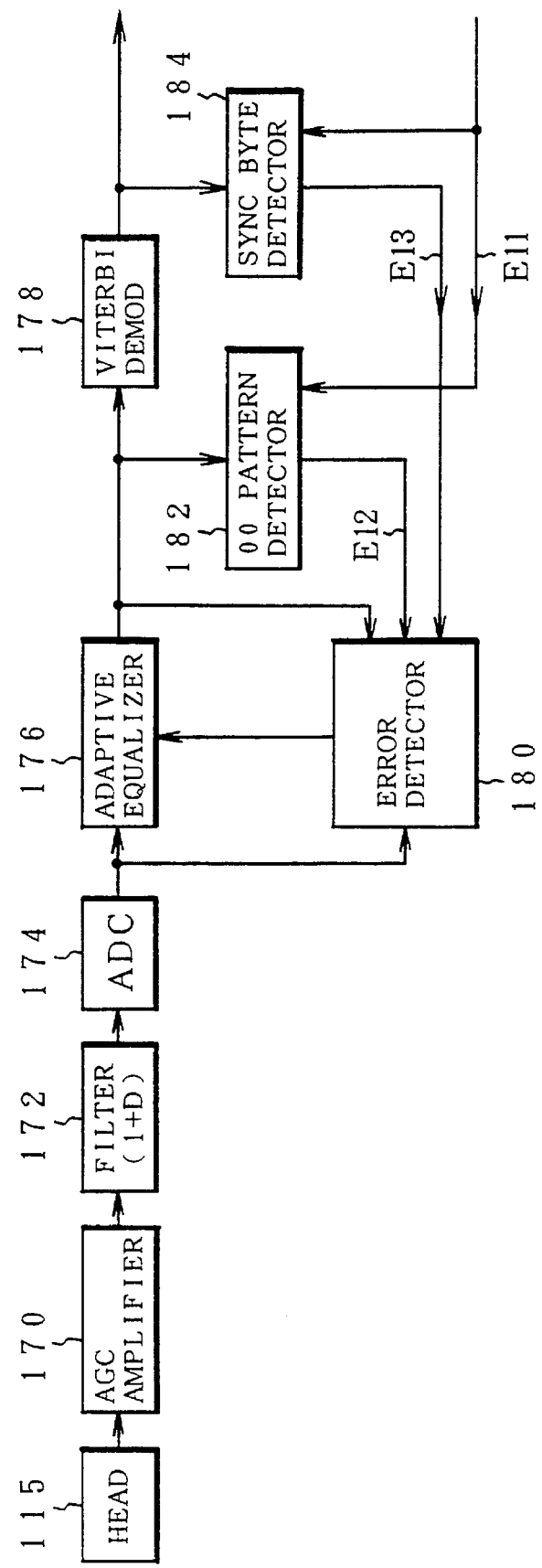
FIG. 1 is a block diagram of a conventional data demodulating circuit.
Figure 3:
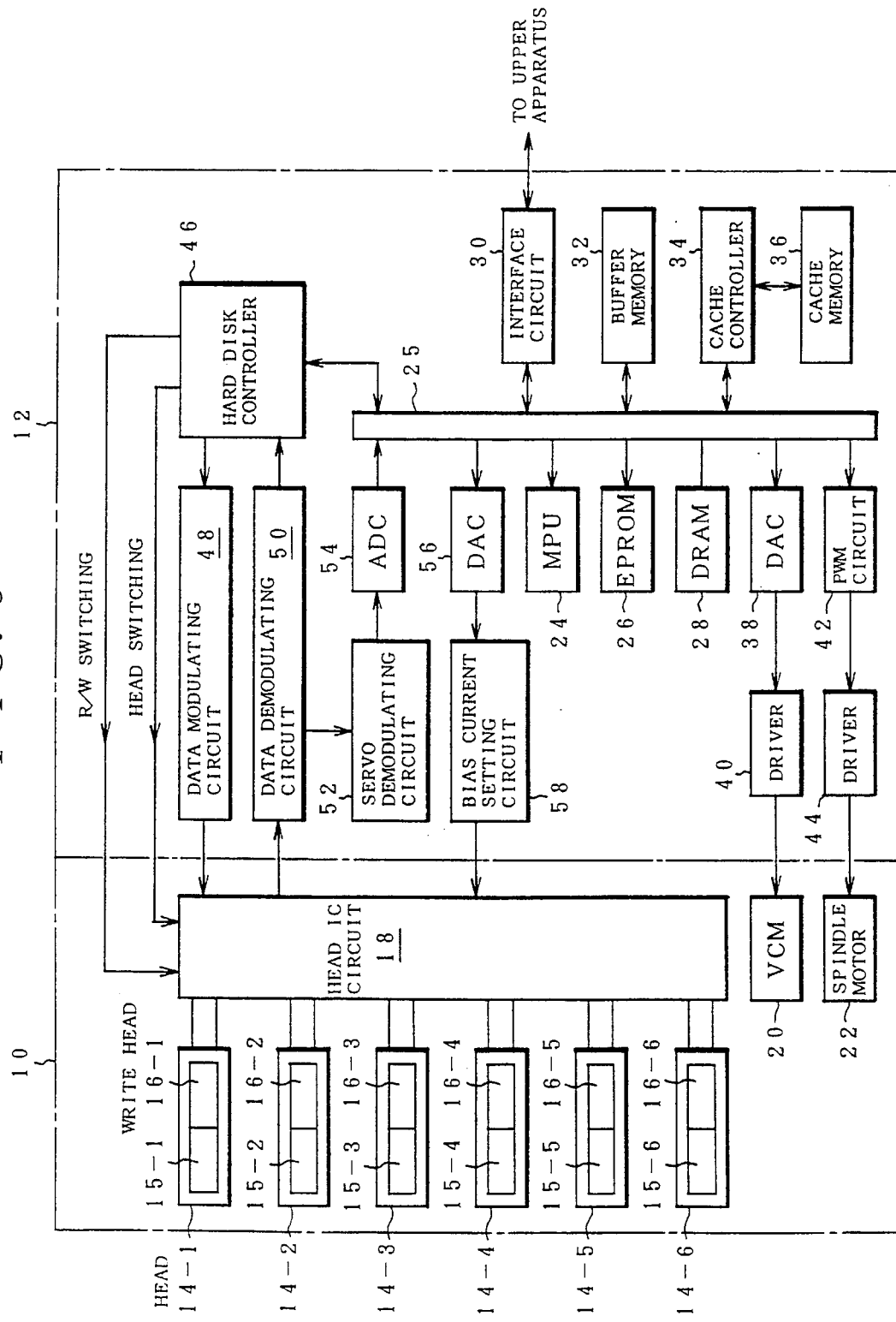
FIG. 3 is a block diagram of a magnetic disk apparatus of the invention using an embedded servo.

FIG. 3 is a circuit block diagram of a magnetic disk apparatus of the invention using an embedded servo system (data surface servo system). The magnetic disk apparatus is constructed by a disk enclosure 10 and a drive controller 12. A plurality of magnetic disks are rotatably provided for the disk enclosure 10. For example, when it is now assumed that three magnetic disks are provided, six disk surfaces are obtained and all of the disk surfaces are used as data surfaces. Data heads 14-1 to 14-6 are provided for the disk enclosure 10 in correspondence to the six data surfaces of the three magnetic disks. Read heads 15-1 to 15-6 and write heads 16-1 to 16-6 are provided for the data heads 14-1 to 14-6, respectively. MR heads are used as read heads 15-1 to 15-6 and ordinary inductive heads are used as write heads 16-1 to 16-6. A spindle motor 22 for rotating the disks and a VCM 20 for positioning the heads are also provided for the disk enclosure 10.

An MPU 24 functioning as a control section is provided for the drive controller 12. An EEPROM 26 (serving as a read only memory) which is used as a program memory and a DRAM 28 (serving as a writable memory) are provided for a bus 25 of the MPU 24. An interface circuit 30 and a buffer memory 32 for data transfer are further provided for the bus 25 of the MPU 24. For example, an SCSI is used as an interface circuit 30 and transmits or receives commands and data to/from an upper disk control apparatus. Further, a cache controller 34 and a cache memory 36 are provided. The spindle motor 22 of the disk enclosure is controlled by a PWM circuit 42 and a driver 44. The head position of the VCM 20 of the disk enclosure is controlled by a D/A converter 38 and a driver 40. In any case, a driving of the spindle motor 22 and a head positioning control by the VCM 20 are executed by a program control by the MPU 24. A data modulating circuit 48 for writing data onto the magnetic disks on the disk enclosure 10 side and a data demodulating circuit 50 for reading data are provided. The data modulating circuit 48 and data demodulating circuit 50 execute a data transfer with the buffer memory 32 through a hard disk controller 46 having a function as a formatter. The hard disk controller performs a read/write switching for a head IC circuit 18 and a head selection. A servo demodulating circuit 52 for demodulating the head position from the servo information on the data surface read out by the read head provided for either one of the data heads 14-1 to 14-6 selected by the head IC circuit 18 of the disk enclosure 10, is further provided for the drive controller 12. A head position signal obtained by the servo demodulating circuit 52 is supplied to the MPU 24 via an A/D converter 54 and is used for the head positioning control. Further, since the MR heads are used as read heads 15-1 to 15-6 of the data heads 14-1 to 14-6, a bias current setting circuit 58 for supplying a bias current (sense current) to determine an operation point of the MR head is provided. Bias current set data determined on the MPU 24 side is converted to an analog voltage by a D/A converter 56, and is supplied to the bias current setting circuit 58. The circuit 58 supplies the bias current according to an output voltage of the D/A converter 56 to the MR head.

Figure 4:
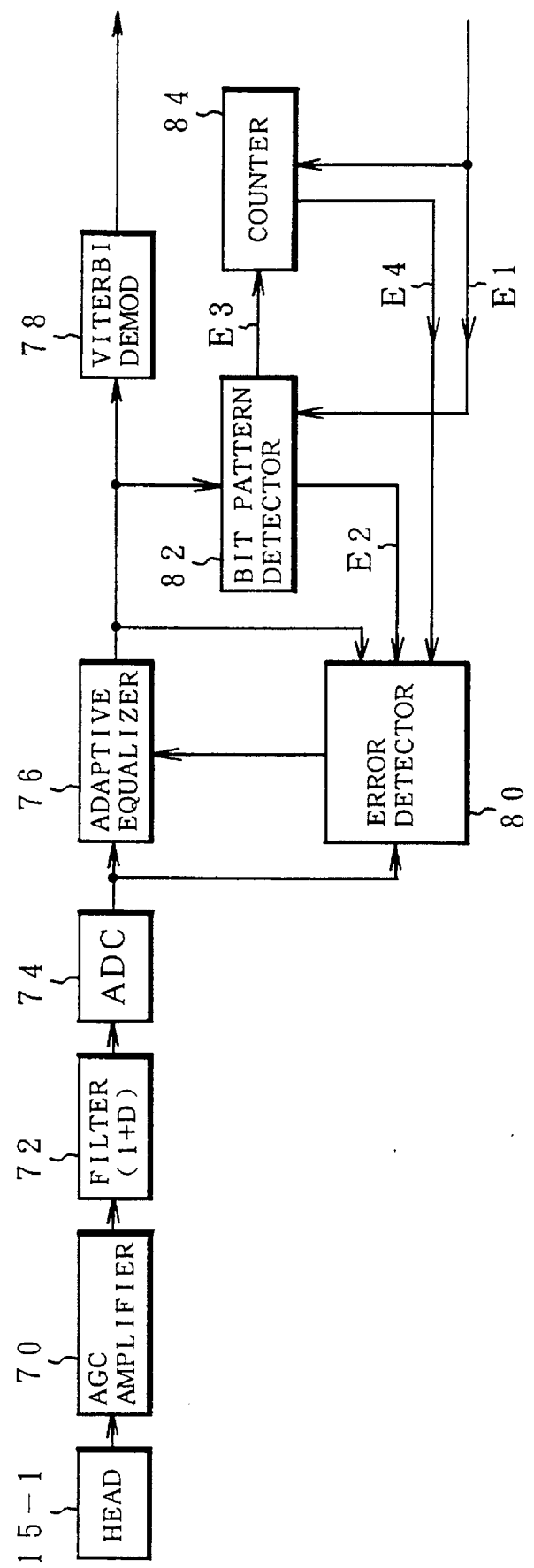
FIG. 4 is a block diagram of a data demodulating circuit in FIG. 3.

FIG. 4 is a block diagram of the data demodulating circuit 50 provided for the drive controller 12 in FIG. 3. A PR4ML is used as a level detecting method. With respect to the disk enclosure side, a state in which the read head 15-1 is selected is shown in a fixed connection manner. The data demodulating circuit 50 for equalizing the waveform of the PR4ML method executes an analog filtering process prior to the PR4 equalization by a (1+D) filter 72 subsequent to an AGC amplifier 70. An A/D converter 74 is subsequently provided and samples an analog output signal of the (1+D) filter 72 at a period according to a recording frequency, thereby converting to digital data. The digital data of the read waveform sampled by the A/D converter 74 is supplied to an adaptive equalizer 76 and the waveform data is subjected to the waveform equalization according to a set equalization amount, thereby suppressing an interference between bits. A transversal filter known as an adaptive type equalizer is used as an adaptive equalizer 76. The optimum equalization amount can be determined by adjusting the tap coefficients of the transversal filter. The tap coefficients are adjusted to determine the optimum equalization amount of the transversal filter by a method whereby an equalization error between an input waveform and an output equalization waveform is detected by an error detector 80 while supplying a predetermined training pattern, and the error is fed back to the adaptive equalizer 76, and the equalization amount is determined so as to minimize the error. The waveform data subjected to the waveform equalization according to a partial response by the adaptive equalizer 76 is supplied to a Viterbi demodulator 78. The most correct bit at the present time point is detected by an estimation of a data train of a predetermined bit length obtained by going back from the present time point to the past in accordance with an algorithm of the maximum likelihood method, thereby demodulating the data. The data train detected by the Viterbi demodulator 78 is subjected to, for example, an 8–9 run length inverse conversion and a descramble for returning to the original data train by a decoder/descrambler circuit (not shown) and is outputted as NRZ data serving as final read data.

The training operation by the error detector 80, when the read waveform of the training pattern is supplied to the adaptive equalizer 76, is initiated by a detection signal E2 of a bit pattern detector 82 and is terminated by an output signal E4 of a counter 84. On a magnetic disk used in the magnetic disk apparatus of the invention, a training pattern of nine bits "100110011" of FIG. 5A is recorded. For example, the recording is performed in a state in which such a training pattern is repeated twice as shown in FIG. 5B. For such a recording state of the training pattern of the disk medium, the bit pattern detector 82 in FIG. 4 repeatedly detects a bit pattern "00" included in the training pattern. When the "00" pattern is first detected in a state in which a read gate signal E1 is set to the H level and to an enable state, the bit pattern detector 82 generates the start instruction signal E2 to the error detector 80, thereby starting the training operation of the adaptive equalizer 76 by the error detector 80. The bit pattern detector 82 outputs a pattern detection signal E3 to the counter 84 each time the "00" pattern included in the training pattern is detected for a period of time during which the read signal of the training pattern which was subjected to the waveform equalization by the adaptive equalizer 76 is outputted. When the pattern of FIG. 5B is used as a training pattern, four "00" patterns are included in the pattern. Therefore, the counter 84 counts the number of detection signals E3 of the "00" pattern from the bit pattern detector 82. When the count value reaches four, the counter 84 outputs the end instruction signal E4 to the error detector 80, thereby finishing the training operation. The bit pattern detector 82 and counter 84 can operate in the enable state in which the data demodulating circuit 50 enters an operation state and in which the read gate signal E1 is set to the H level. The detection of the "00" bit pattern in the training pattern by the bit pattern detector 82 and the start and end of the training operation based on the count value detection of the can be also similarily executed with respect to the other bit patterns included in the training pattern.

FIG. 5C shows bit patterns "11" and "00111" in addition to the bit pattern "00" included in the training pattern of FIG. 5A as detection patterns. With respect to those patterns, the number of detection times in the training area is also equal to four.

FIG. 5D shows a case where the number of detection times of the detection pattern is set to three which is smaller than that of FIG. 4 by one, thereby providing redundancy. As mentioned above, by setting the count value at which the counter 84 outputs the end instruction signal E4 to the value which is smaller than the actual number of existing patterns by one, even if there is an erroneous operation such as a detection failure of the detection pattern as a target in the training pattern, the end of the training area can be assuredly detected.

Figure 6:
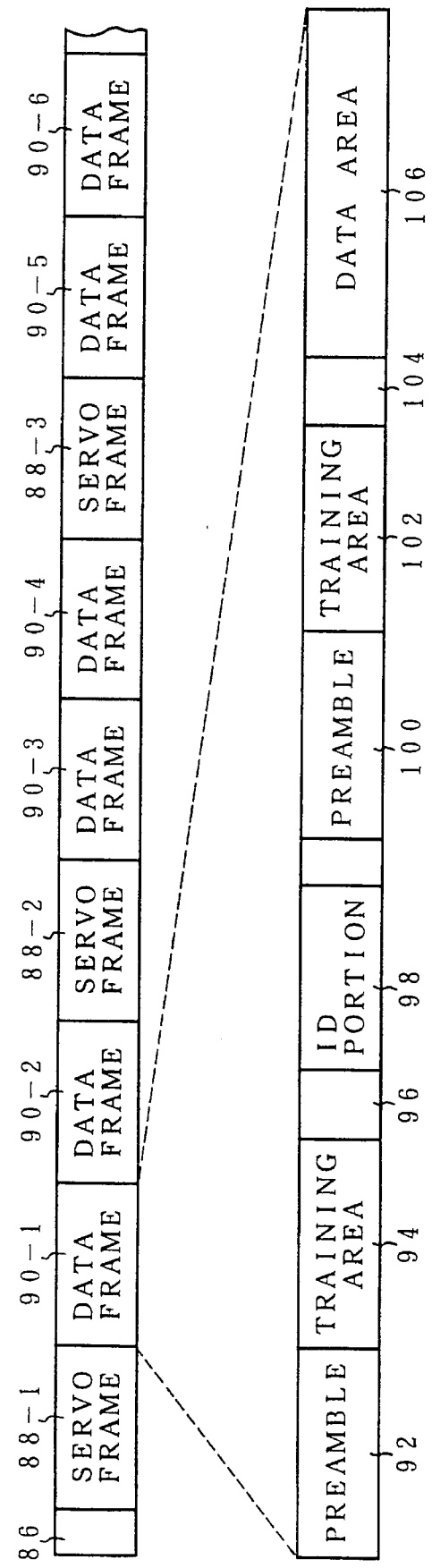
FIG. 6 is an explanatory diagram of a track format of an embodiment of FIG. 3.

FIG. 6 shows a track format of a disk medium which is used in the disk apparatus of FIG. 3. In the disk medium of the embedded servo, subsequent to a head index 86, a servo frame 88-1 is provided. After that, for example, two data frames 90-1 and 90-2 are provided. Similarily, one servo frame and two data frames are repeated. As typically shown in the data frame 90-1, a preamble 92, a training area 94, a sync byte 96, an ID portion 98, a preamble 100, a training area 102, a sync byte 104, and a data area 106 are formed for each of data frames 90-1, 90-2, 90-3, . . .

The training pattern which is used in the training operation of the adaptive equalizer 76 provided for the data demodulating circuit of FIG. 4 is provided at two locations in correspondence to the ID portion 98 and data area 106. That is, the training operation to read the ID portion 98 is executed in the training area 94 and the training operation to read the data area 106 is also executed in the training area 102.

Figure 7:
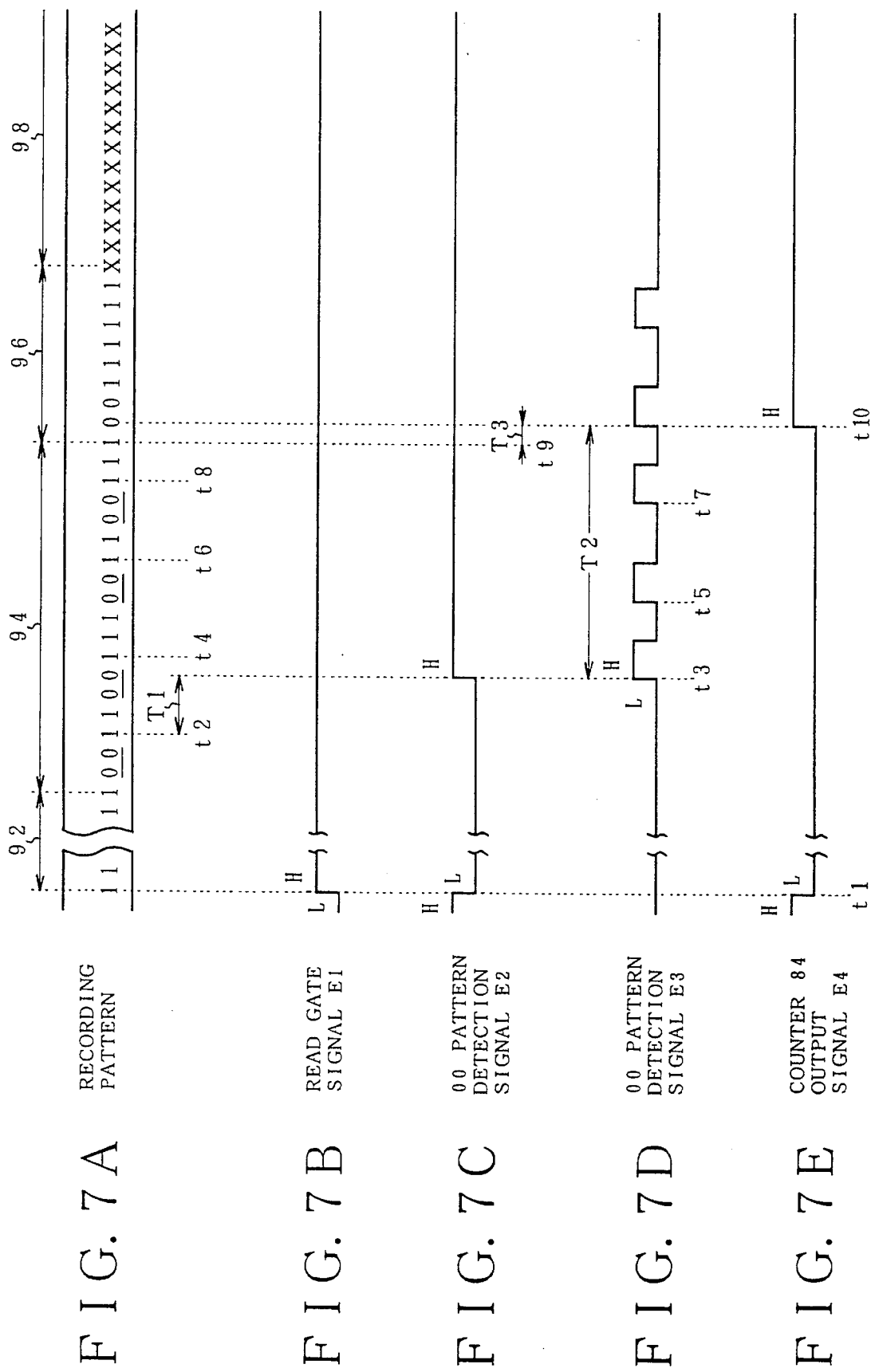
FIGS. 7A to 7E are timing charts in case of detecting a "00" pattern in FIG. 4.

Timing charts of FIGS. 7A to 7E show the training operation of the error detector 80 by the bit pattern detector 82 and counter 84 provided for the data demodulating circuit in FIG. 4. Like a recording pattern of FIG. 7A, it is now assumed that a reading operation by the read head of the recording pattern in a range from the head preamble 92 to the ID portion 98 of the data frame 90-1 in FIG. 6 is executed. In the recording pattern, the preamble 92 is in a recording state of bit 1 and the training area 94 is in the recording state of the training pattern of FIG. 5B. A sync byte pattern "100111111" is recorded as for the sync byte 96 and data of the ID portion 98 is arranged after the sync byte 96. When the reading operation is executed, the read gate signal E1 is set to the H level at a start timing of the data frame at time t1 as shown in FIG. 7B and the bit pattern detector 82 and counter 84 enter the enable state. In such a state, a read signal is generated from the adaptive equalizer 76 and is compared with a preset "00" pattern by the bit pattern detector 82. The detection signal E2 of the bit pattern detector 82 is set to the H level as shown in FIG. 7C at a timing of time t3 after the elapse of a time of, for example, four bits since time t2 when the fetching of the first "00" pattern in the training area 94 is completed. The detection signal E2 becomes a start instruction signal of the training operation to the error detector 80, thereby starting the training operation of the error detector 80 at time t3. The training operation is executed in the following manner. In the training operation, an equalization error between the input waveform sampled by the A/D converter 74 and the output waveform equalized by the adaptive equalizer 76 is detected and the equalization amount of the adaptive equalizer, namely, the tap coefficients of the transversal filter are adjusted so as to minimize such an error. The "00" pattern in the training pattern in the training area 94 is subsequently fetched at timings of times t4, t6, and t8 in FIG. 7A. In a manner similar to the fetching at time t2, the output signal E3 in which the "00" pattern detection signal E3 rises to the H level at timings of times t5, t7, and t10 in FIG. 7D after the elapse of the pattern detection time T1 and trails to the L level at the third bit from times t5, t7, and t10 is generated, respectively.

The counter 84 counts the number of bit pattern detection signals E3 of FIG. 7D. When the fourth output signal E3 is counted at the timing of time t10, since the count value reaches the preset value "4", the output signal E4 is set to the H level as shown in FIG. 7E and the output signal E4 becomes the end instruction signal to the error detector 80, thereby finishing the training operation. As for time t10 when the training operation of the error detector 80 is finished by the output signal E4 of the counter 84, the reading of the training area 94 is finished at time t9 before time t10 and the sync byte 96 is read out from time t9. Therefore, although a period of time from time t9 to t10 is an erroneous training period T3, the erroneous training period T3 is a very short period of about two bits. Although the head bit portion of the sync byte is inputted in the very short training period T3 and the training operation of the error detector 80 is executed, the erroneous error detection is very small in such a period of time and an influence on the equalization of the adaptive equalizer 76 adjusted in the training operation in the training period T2 so far can be suppressed to a very small influence. Thus, the equalization amount of the adaptive equalizer 76 can be adjusted to almost the optimum value according to the pattern of the training signal and is used as a fixed equalization amount until the next training pattern is obtained.

Figure 8:
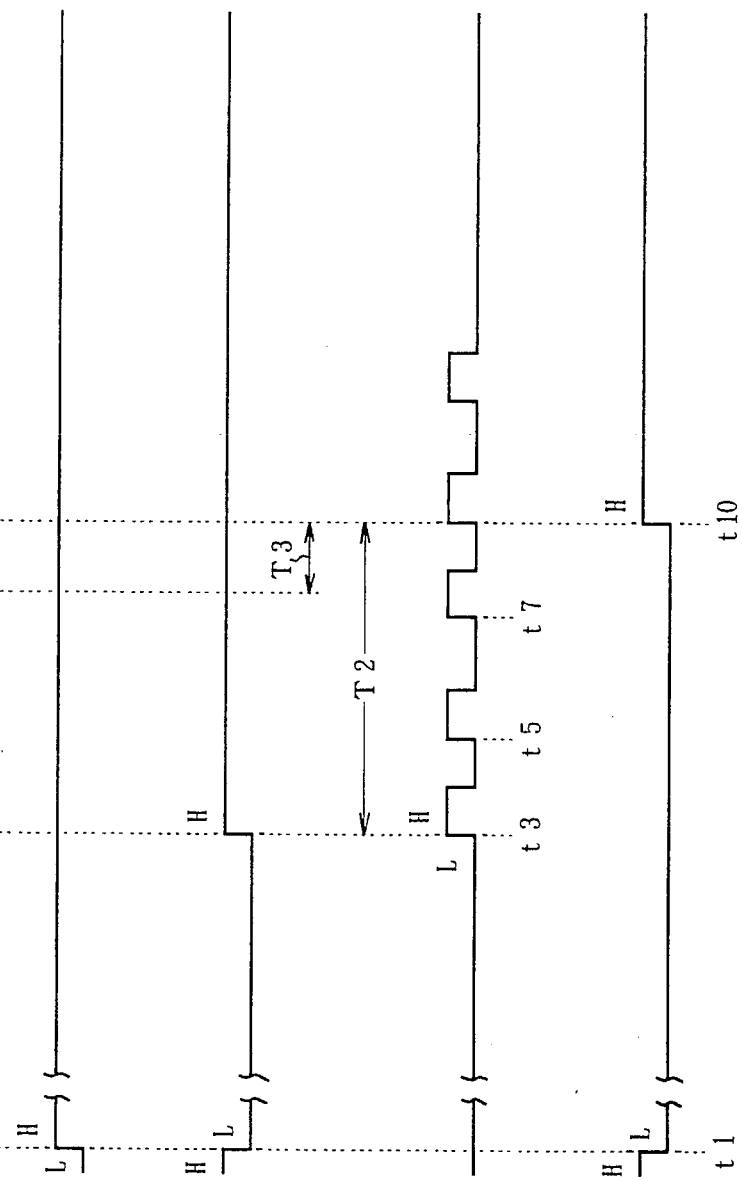
FIGS. 8A to 8E are timing charts in case of detecting a "0011" pattern in FIG. 4.

Timing charts of FIGS. 8A to 8E relate to a case where the "0011" pattern is detected by the bit pattern detector 82 in FIG. 4. In this case, the bit pattern detection signal E2 of FIG. 8C is set to the H level at time t3 after the elapse of the pattern detection time T2 since time t2 when the fetching of the first "0011" pattern in the training area 94 of the recording pattern of FIG. 8A is completed, thereby instructing the start of the training operation to the error detector 80. Simultaneously, the output signal E3 of FIG. 8D from the bit pattern detector 82 to the counter 84 is set to the H level, so that the counting operation of the counter 84 is performed. Subsequently, the bit pattern detection signal E3 is transmitted as shown in FIG. 8D at timings of times t5, t7, and t10 in FIG. 8D after the elapse of the pattern detection time T2 since times t4, t6, and t8 in FIG. 8A when the fetching of the "0011" pattern is completed. The count value of the counter 84 reaches the predetermined value "4" at time t10, so that the output signal E4 is set to the H level and the end instruction signal is generated to the error detector 80, thereby finishing the training operation.

With respect to the detection of the "0011" pattern in FIGS. 8A to 8E, the erroneous training period T3 from time t8 to time t10 is longer than that of the detection of the "00" pattern of FIGS. 7A to 7E by a time corresponding to two bits as a difference occurring by the change from four bits to two bits of those detection patterns. However, when it is compared with the end of the training operation based on the detection of the sync byte shown in FIG. 2, the erroneous training period is very short and a degree such that the equalization amount of the adaptive equalizer 76 adjusted by the training pattern in the training area 94 fluctuates by the sync byte pattern in the erroneous training period T3 can be remarkably reduced.

The start and end of the training operation using the "11" pattern in FIGS. 5C and 5D can be also executed. Since the "11" pattern also exists in the preamble 92, the training operation is started when the detection value of the "11" pattern reaches a predetermined value and the training operation is finished when the detection value reaches a count value obtained by adding "4" which is the number of "11" patterns in the training area 94 to the predetermined value.

Figure 9:
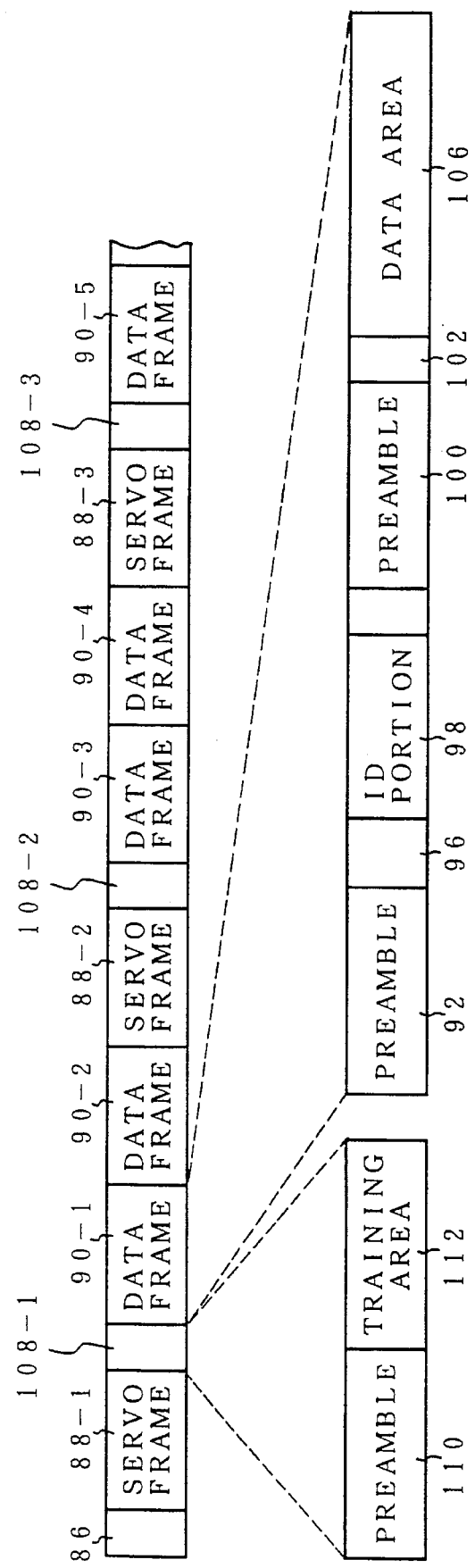
FIG. 9 is an explanatory diagram of a track format in which a training area is provided at the end of a servo frame.

FIG. 9 shows another embodiment of a track format of the disk medium used in the embedded servo system (data surface servo system) of FIG. 3. The embodiment is characterized by providing a training frame 108-1 constructed by a preamble 110 and a training area 112 after the servo frame 88-1 subsequent to the index 86. The two data frames 90-1 and 90-2 are provided after the training frame 108-1. Such a construction of the servo frame, training frame, and data frame is also similarly repeated with respect to a servo frame 88-2 and subsequent frames. In the embodiment of FIG. 9, therefore, each of training frames 108-1, 108-2, 108-3, . . . is provided for each of servo frames 88-1, 88-2, 88-3, . . . in the track format. By providing the training frame for every servo frame, for instance, as shown in the data frame 90-1, the data frame is constructed by the preamble 92, sync byte 96, ID portion 98, preamble 100, sync byte 104, and data area 106. There is no need to provide two training areas 94 and 102 corresponding to the ID portion 98 and data area 106 as shown in FIG. 6. By providing the training frame for every servo frame, since the number of servo frames is so small to be the half of that of the data frames and is small in the embodiment, a ratio occupied by the training area included in the track format can be remarkably reduced. The training areas conventionally provided at two locations in the data frame are unnecessary, so that the ratio of the training area occupied in the track format can be reduced by an amount corresponding to such unnecessary areas. Consequently, even if the training pattern for performing the waveform equalization of the partial response is provided in the embedded servo, a decrease in memory capacity of the disk medium which is caused by providing the training pattern can be minimized.

Figure 10:
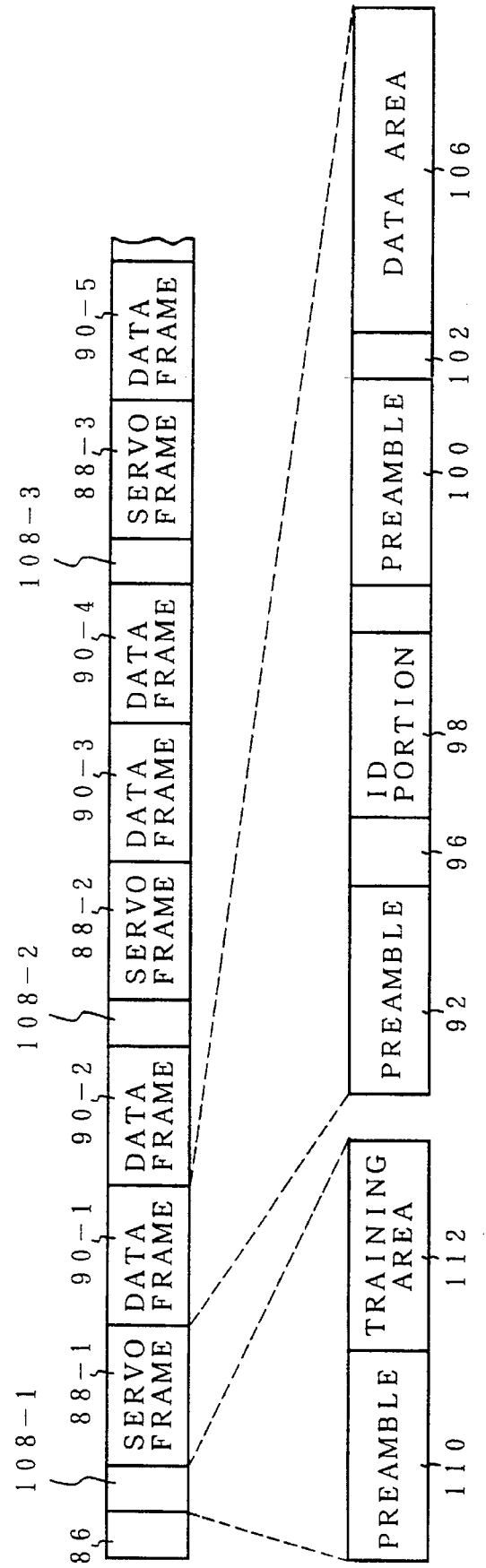
FIG. 10 is an explanatory diagram of a track format in which a training area is provided at the head of the servo frame.

FIG. 10 shows another embodiment in case of providing a training frame for every servo frame in the disk medium of the embedded servo. Although the training frames 108-1, 108-2, 108-3, . . . are provided after the servo frames 88-1, 88-2, 88-3, . . . , respectively, in the embodiment of FIG. 9, the embodiment of FIG. 10 is characterized by providing the training frames 108-1, 108-2, 108-3, . . . before the servo frames 88-1, 88-2, 88-3, . . . , respectively. The training area 112 can also be included in the servo frames 88-1, 88-2, 88-3, . . .

Figure 11:
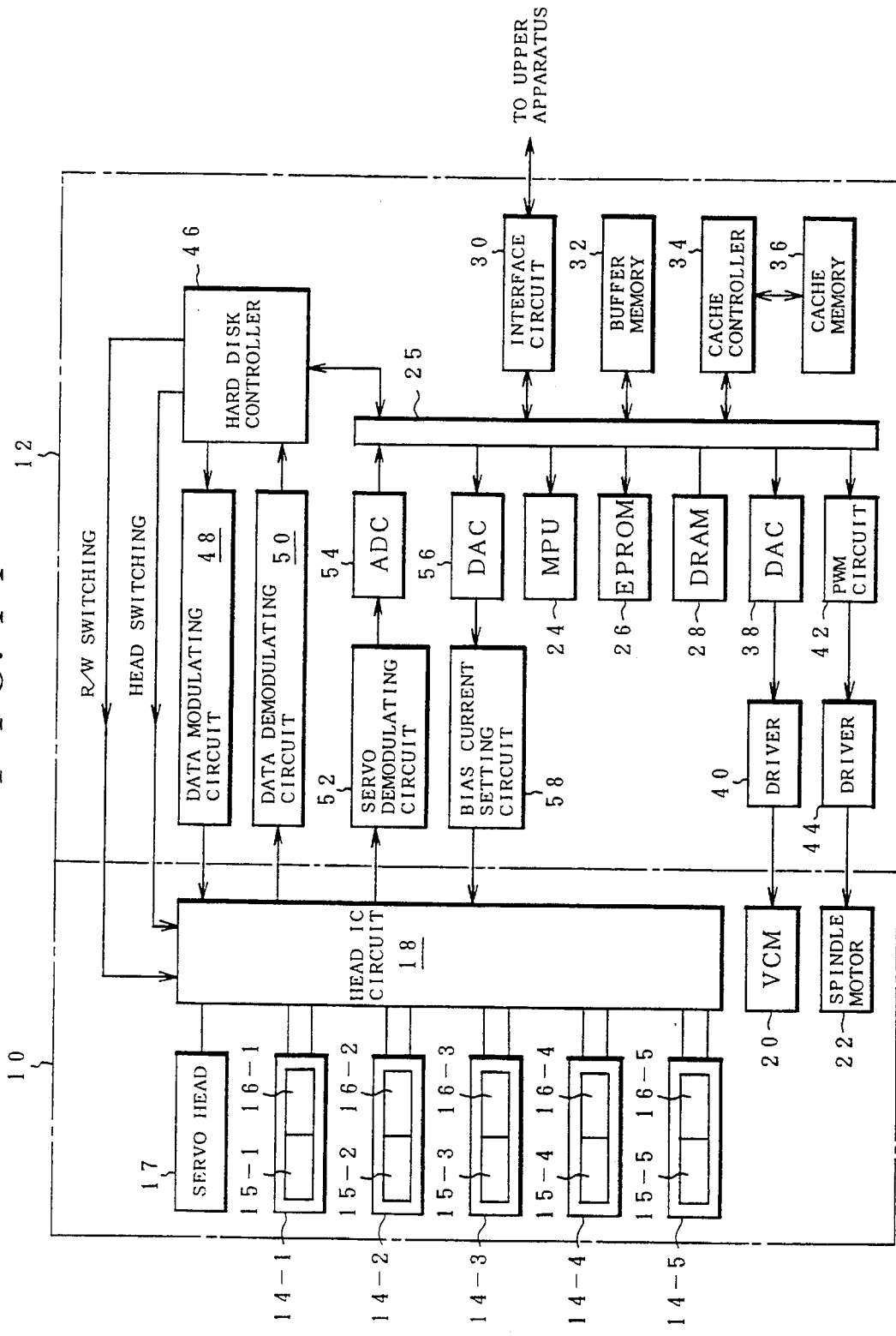
FIG. 11 is a block diagram of a magnetic disk apparatus of the invention using a servo surface servo system.

FIG. 11 is a block diagram of a magnetic disk apparatus of the invention using a servo surface servo system. In the magnetic disk apparatus using the servo surface servo system, for example, assuming that the number of magnetic disks is equal to three, the number of medium surfaces is equal to six. Servo information is recorded onto one of the six medium surfaces and the remaining five medium surfaces are used as data surfaces. A servo head 17 for reading out the servo information in correspondence to the servo surface of the disk medium is provided for the disk enclosure 10. Since the number of data surfaces is equal to five, the data heads 14-1 to 14-5 are provided. The servo information on the servo surface read out by the servo head 17 is supplied to the servo demodulating circuit 52 through the head IC circuit 18. A demodulated head position signal is fetched by the A/D converter 54 and is supplied to the MPU 24.

FIG. 12 shows a track format in the servo surface servo of FIG. 11. Subsequent to a head index 114, an ID portion 116-1 and a data area 118-1 are provided and such a construction is repeated after that. As typically shown in the ID portion 116-1, a preamble 120, a training area 122, a sync byte 124, ID data 126, a preamble 128, and user data 130 are provided for each of ID portions 116-1, 116-2, 116-3, 116-4, . . . The training pattern "100110011" of FIG. 5A is recorded, for example, in a state in which such a pattern is repeated twice as shown in FIG. 5B in the training area 122. A construction of the data demodulating circuit 50 in FIG. 11 is also similar to the circuit construction of FIG. 4 of the embodiment of FIG. 3. The training operation of FIG. 11 is also similar to that shown by the timing charts of FIGS. 7A to 7E with respect to the "00" pattern and the training operation of FIG. 11 is similar to that shown by the timing charts of FIGS. 8A to 8E with respect to the "0011" pattern.

According to the invention as mentioned above, after the training operation was started by the detection of a predetermined bit pattern in the training pattern, the number of detection times of the pattern is counted, and when the count value reaches a predetermined value, the training operation is finished, so that the erroneous training period such that patterns other than the training pattern enter in the training period can be minimized. The optimum adjusting state of the equalization amount so as to minimize the equalization error of the adaptive type equalizer by the training is set, the waveform equalization of the data reading operation after that can be properly executed, the error rate of the magnetic disk apparatus is decreased, and a reliability can be improved.

By providing the training pattern for every servo frame in the track format of the embedded servo, the number of training areas per track is remarkably reduced, the decrease in memory capacity in case of providing the training areas is suppressed, and the formatting efficiency can be improved.

Although the magnetic disk apparatus in which a processing function as a formatter is provided on the disk drive side which is constructed by the disk enclosure and the drive controller, and the modulation of the write data and the demodulation of the read data are completely performed has been mentioned as an example in the foregoing embodiments, the invention can be also applied as it is to a magnetic disk apparatus in which the formatter function is not provided on the disk driver side but on an upper disk control apparatus and data is transmitted or received to/from the upper disk control apparatus at the NRZ data level and the formatter function is performed in a lump by the upper disk control apparatus.

Although the case where the training pattern "100110011" is used has been mentioned as an example, any training pattern other than it can be also used. Further, the invention is not limited to the numerical values shown in the above-mentioned embodiments. The invention can be applied to an optical disk apparatus other than the magnetic disk apparatus.

What is claimed is:

1. A disk apparatus comprising:

a disk medium having a training pattern used for a waveform equalization preliminarily recorded thereon;

an equalizer for equalizing a waveform so as to suppress an interference between bits of a signal waveform obtained by reading said disk medium by a read head;

an error detector for executing a training to adjust an equalization amount of said equalizer so as to minimize an error due to the interference between bits of the read waveform on the basis of said training pattern read out from said disk medium;

a bit pattern detector for detecting a repeat of a predetermined bit pattern included in the read signal of said training pattern and instructing said error detector to start executing a training upon detection of said first bit pattern: and a counter for counting the number of detection times of said bit pattern by said bit patter detector and instructing said error detector to end training when said number of detection times reaches a predetermined value.

2. An apparatus according to claim 1, wherein a pattern of "100110011" or a pattern in which the pattern "100110011" is repeated a plurality of times is recorded as a training pattern onto said disk medium.

3. An apparatus according to claim 2, wherein said bit pattern detector detects a bit pattern "00" and instructs said error detector to start executing training.

4. An apparatus according to claim 3, wherein said counter counts the number of detection times of the bit pattern "00" by said bit pattern detector and instructs said error detector to stop executing a training when the number of detection times reaches the number of bit patterns "00" included in said training pattern.

5. An apparatus according to claim 2, wherein said bit pattern detector detects a bit pattern "11" and instructs said error detector to start executing a training.

6. An apparatus according to claim 5, wherein said counter counts the number of detection times of the bit pattern "11" by said bit pattern detector and instructs said error detector to stop executing a training when the number of detection times reaches the number of bit patterns "11" included in said training pattern.

7. An apparatus according to claim 2, wherein said bit pattern detector detects a bit pattern "0011" and instructs said error detector to start executing a training.

8. An apparatus according to claim 7, wherein said counter counts the number of detection times of the bit pattern "0011" by said bit pattern detector and instructs said error detector to stop executing a training when the number of detection times reaches the number of bit patterns "0011" included in said training pattern.

9. An apparatus according to any one of claims 3, 5, and 7, wherein said counter instructs said error detector to stop executing a training when the count value reaches a predetermined value that is smaller than the number of bit patterns as detection targets included in said training pattern.

* * * * *

UNITED STATES PATENT AND TRADEMARK OFFICE
CERTIFICATE OF CORRECTION

Page 1 of 2

PATENT NO. : 5,623,474
DATED : April 22, 1997
INVENTOR(S) : Oshio et al.

It is certified that error appears in the above-indentified patent and that said Letters Patent is hereby corrected as shown below:

Column 1, line 47, delete "is." and insert --is detected-- therefor.

Column 2, line 41, after "byte" (first occurrence), insert --is--.

Column 3, line 3, after "ization", insert --error--.

Column 3, line 24, delete "of".

Column 6, line 55, delete "detection of".

Column 6, line 56, delete "the" (first occurrence)--.

UNITED STATES PATENT AND TRADEMARK OFFICE
CERTIFICATE OF CORRECTION

PATENT NO. : 5,623,474
DATED : April 22, 1997
INVENTOR(S) : Oshio, et. al.

It is certified that error appears in the above-identified patent and that said Letters Patent is hereby corrected as shown below:

Column 10, line 65, delete "patter" and insert --pattern--.

Signed and Sealed this

Second Day of June, 1998

Attest:

BRUCE LEHMAN

Attesting Officer

Commissioner of Patents and Trademarks